(12) United States Patent
Kawaura

(10) Patent No.: US 9,069,508 B2
(45) Date of Patent: Jun. 30, 2015

(54) INFORMATION PROCESSING METHOD AND INFORMATION PROCESSING APPARATUS GENERATING A PRINT COMMAND BASED ON SPOOL DATA OF A PRINT JOB

(75) Inventor: Toshinori Kawaura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 738 days.

(21) Appl. No.: 12/955,760

(22) Filed: Nov. 29, 2010

(65) Prior Publication Data

US 2011/0141507 A1 Jun. 16, 2011

(30) Foreign Application Priority Data

Dec. 16, 2009 (JP) .................................. 2009-285454

(51) Int. Cl.
*G06F 3/12* (2006.01)

(52) U.S. Cl.
CPC .............. *G06F 3/1284* (2013.01); *G06F 3/121* (2013.01); *G06F 3/1234* (2013.01)

(58) Field of Classification Search
CPC ............. G06F 3/1234; H04N 1/00188; H04N 1/32635; H04N 1/32625
USPC ....... 358/1.13, 1.16; 714/2; 715/274
See application file for complete search history.

(56) References Cited

U.S. PATENT DOCUMENTS

| | | | | |
|---|---|---|---|---|
| 5,138,561 | A | * | 8/1992 | Crowe ........................... 358/1.3 |
| 7,180,623 | B2 | * | 2/2007 | Kato ............................ 358/1.15 |
| 7,612,899 | B2 | | 11/2009 | Kadota |
| 2009/0040546 | A1 | * | 2/2009 | Hirakawa ..................... 358/1.14 |

FOREIGN PATENT DOCUMENTS

| | | |
|---|---|---|
| JP | 3209911 A | 9/1991 |
| JP | 9311770 A | 12/1997 |
| JP | 2003-167719 | 6/2003 |
| JP | 2005-84898 | 3/2005 |

OTHER PUBLICATIONS

Japanese Office Action dated Nov. 26, 2013 issued during prosecution of related Japanese application No. 2009-285454.

* cited by examiner

*Primary Examiner* — Peter K Huntsinger
(74) *Attorney, Agent, or Firm* — Fitzpatrick, Cella, Harper & Scinto

(57) ABSTRACT

A printer driver generates a print command based on the spool data of a print job to thereby transmit the print command to a printer. The printer driver manages a correspondence between job identification information that identifies a print job for which an error occurred and information about the number of printed pages at the moment when the error occurred in a storage device. When it is determined that the print job to be processed is a data type to be spooled by an intermediate drawing command and the job identification information for the print job to be processed is managed by the storage device, the printer driver skips page configuration processing relating to printed pages and generates a print command based on the information about the number of printed pages, which corresponds to the job identification information and is managed by the storage device.

7 Claims, 9 Drawing Sheets

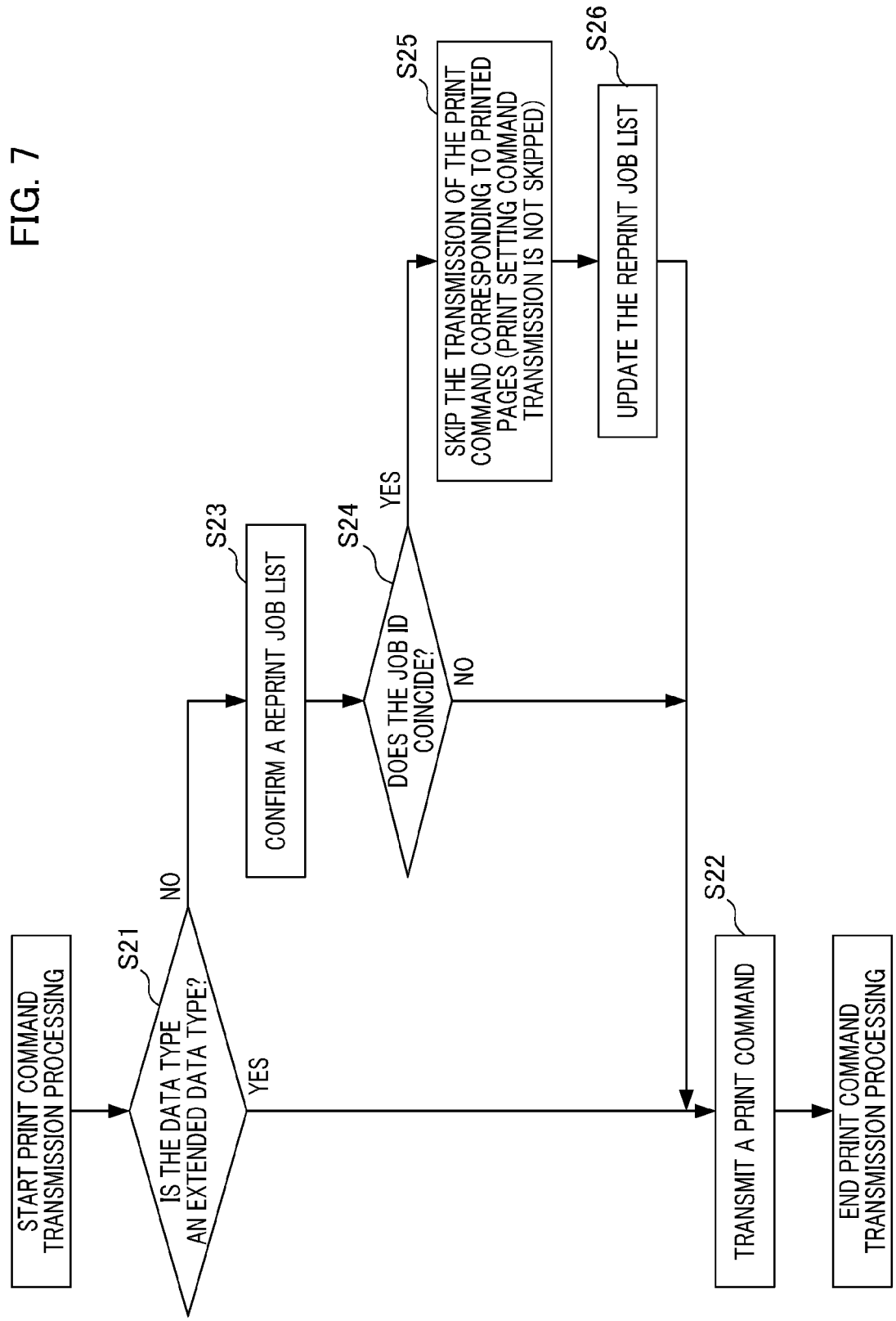

| | JOB ID | THE NUMBER OF PRINTED PAGES | TYPE OF ERROR |
|---|---|---|---|
| 1 | 5 | 4 | PAPER ABSENCE ERROR |
| 2 | 8 | 2 | PAPER JAM ERROR |
| ... | ... | ... | ... |

INFORMATION PROCESSING METHOD AND INFORMATION PROCESSING APPARATUS GENERATING A PRINT COMMAND BASED ON SPOOL DATA OF A PRINT JOB

BACKGROUND OF THE INVENTION

1. Field of the Invention

The present invention relates to an information control technique applied to an information processing apparatus that communicates with a printing device.

2. Description of the Related Art

There has been proposed a method for reprinting a missing page, when the missing page occurs due to an error which occurred in a printing device. For example, Japanese Patent No. 3209911 discloses a printing control apparatus in which, when an instruction about cancellation of printing processing has been made during the printing processing, printing processing skips, without carrying out printing processing, to the page(s) of already generated output data and resumes the printing of pages. In addition, Japanese Patent Laid-Open No. 09-311770 discloses an information processing apparatus in which, when an error occurs in the printing device and printing is resumed after recovery from the error, printing is restarted from the page at which the error occurred by designating the page number of the page that was being printed, which was stored in a storage unit, as the first page for a restart of printout to thereby reprint from the page at which the error occurred. Applying the technique disclosed in Japanese Patent Laid-Open No. 09-311770, a printing control apparatus can rewrite the print start page information in a temporary file, which has been spooled by the OS (Operating System), at the time of the error occurrence to thereby reprint from the page at which the error occurred.

However, the printing control apparatus disclosed in Japanese Patent No. 3209911 simply skips printing processing for the generated page(s) when a page is reprinted after the error occurrence. Thus, according to the printing control apparatus, the print setting command corresponding to the pages for which printing processing has been skipped is not transmitted to the printing device (print setting command transmission processing is skipped). The print setting command is a command relating to the print setting. Thus, for example, for a printing device that accumulates a print setting command for an update, there is a problem in that, if print setting command transmission processing is skipped, the output result of the reprinted page is different from the output result obtained when printing is normally completed without an error occurrence.

In addition, for example, in the system spooler of the Windows™ system, the printing control apparatus cannot perform rewriting processing for the print start information about the temporary file that has been spooled by the OS. Thus, the technique disclosed in Japanese Patent Laid-Open No. 09-311770 cannot be applied to the Windows™ system.

SUMMARY OF THE INVENTION

The present invention provides an information processing method, an information processing apparatus, and a computer program that can increase the efficiency of reprint processing for a page at the time of an error occurrence.

According to an aspect of the present invention, an information processing method is provided that includes the steps of generating, in a print command generation step, a print command based on the spool data of a print job; transmitting, in a print command transmission control step, the print command, which has been generated in the print command generation step, to a printing device in order to print the pages corresponding to the print command on the printing device; and managing, in a managing step, a correspondence between job identification information that identifies a print job for which an error occurred and information about the number of printed pages at the moment when the error occurred in a storage device. When it is determined that the print job to be processed is a data type to be spooled by an intermediate drawing command and the job identification information for the print job to be processed is managed by the storage device, the print command generation step skips page configuration processing relating to printed pages and generates a print command based on the information about the number of printed pages, which corresponds to the job identification information and is managed by the storage device.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a diagram illustrating print command transmission processing of the printer driver of Example 2.

DESCRIPTION OF THE EMBODIMENTS

Figure 1:
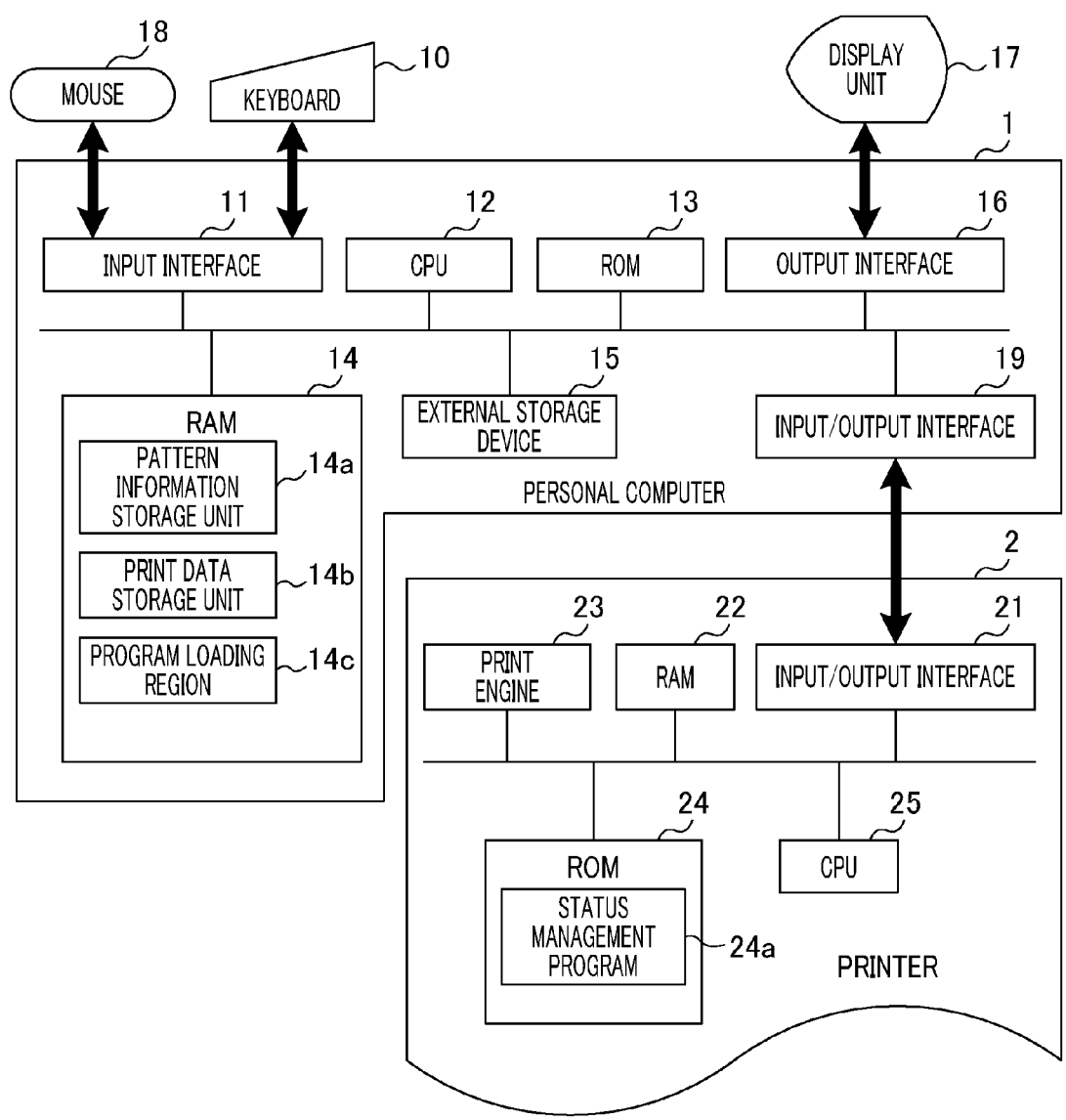
FIG. 1 is a diagram illustrating an example of the system configuration according to the present embodiment.

FIG. 1 is a diagram illustrating an example of the system configuration according to the present embodiment. The print system of the present embodiment includes a personal computer 1 and a printer 2. The personal computer 1 is the information processing apparatus of the present embodiment, and is connected with the printer 2 that serves as a printing device. The personal computer 1 generates a print command corresponding to a print job and transmits the print command to the printer 2 for the execution of print processing. The personal computer 1 is connected with the printer 2 via a network. As an operation specific to the present embodiment, the personal computer 1 skips page configuration processing relating to printed pages by employing the function of a printer driver 103 shown in FIG. 2, when an error occurs during page printing and the pages corresponding to the print job is reprinted. Page configuration processing is processing for determining the page configuration of print data. For example, page configuration processing is processing in which two pages are set to be printed out on a single sheet of paper or the next page is set to be printed out on the back of the paper on which the first page has been printed out. By performing page configuration processing, print data becomes data interpretable by a printer.

The personal computer 1 includes an input interface 11, a CPU (Central Processing Unit) 12, a ROM (Read Only Memory) 13, and a RAM (Random Access Memory) 14. The personal computer 1 further includes an external storage device 15, an output interface 16, a display unit 17, a keyboard 10, a mouse 18, and an input/output interface 19. The input interface 11 inputs information relating to a user operation input by employing the mouse 18 and the keyboard 10 to the personal computer 1. The CPU 12 overall controls the personal computer 1. The initialization program is stored in advance in the ROM 13. The RAM 14 is a storage unit to be employed as a work memory for various programs stored in the external storage device 15. The RAM 14 is a storage unit that includes, for example, a pattern information storage unit 14a that stores pattern information, a print data storage unit 14b that stores print data, a program loading region 14c that loads various programs, and the like.

Application, OS, printer driver, and the like are stored in the external storage device 15. The functions of application, OS, and a printer driver that are stored in the external storage device 15 will be described below with reference to FIG. 2. The output interface 16 is a communication interface between the display unit 17 and the personal computer 1. The CPU 12 transmits display data to the display unit 17 via the output interface 16. The input/output interface 19 is a communication interface between the personal computer 1 and the printer 2. The CPU 12 transmits a print command to the printer 2 via the input/output interface 19.

The printer 2 is a processing device that receives the print command that has been transmitted from the personal computer 1 to thereby print out print data corresponding to the print command. The printer 2 includes an input/output interface 21, a RAM 22, a print engine 23, a ROM 24, and a CPU 25. The input/output interface 21 is connected with the input/output interface 19 of the personal computer 1, and mediates communications between the printer 2 and the personal computer 1. In the present embodiment, the input/output interface 21 is, for example, a USB (Universal Serial Bus). However, the input/output interface 21 provided in the printer 2 is not limited to a USB. The printer 2 may include any communication interface as the input/output interface 21.

The RAM 22 is employed as the main memory and the working memory of the CPU 25, and stores various data. Also, the RAM 22 includes a reception buffer that temporarily stores print data. The print engine 23 performs print processing based on the data stored in the RAM 22. Various control programs such as a status management program 24a or the like and data to be used by the respective control programs are stored in advance in the ROM 24. The CPU 25 controls the respective units of the printer 2 in accordance with the control program that is stored in the ROM. The status management program 24a generates status information by monitoring the state of the printer 2 based on information from various sensors provided internally in the printer 2 and stores it in the RAM 22 for management. Status information is information that indicates the state of the printer 2.

Note that the system configuration provided with the information processing apparatus of the present invention is not limited to the system configuration shown in FIG. 1. While in the present embodiment, a description will be given of an example in which the printer driver 103 shown in FIG. 2 executes print control processing, the printer 2 may include any print control processing execution unit that has substantially the same function as that of the printer driver 103.

Figure 2:
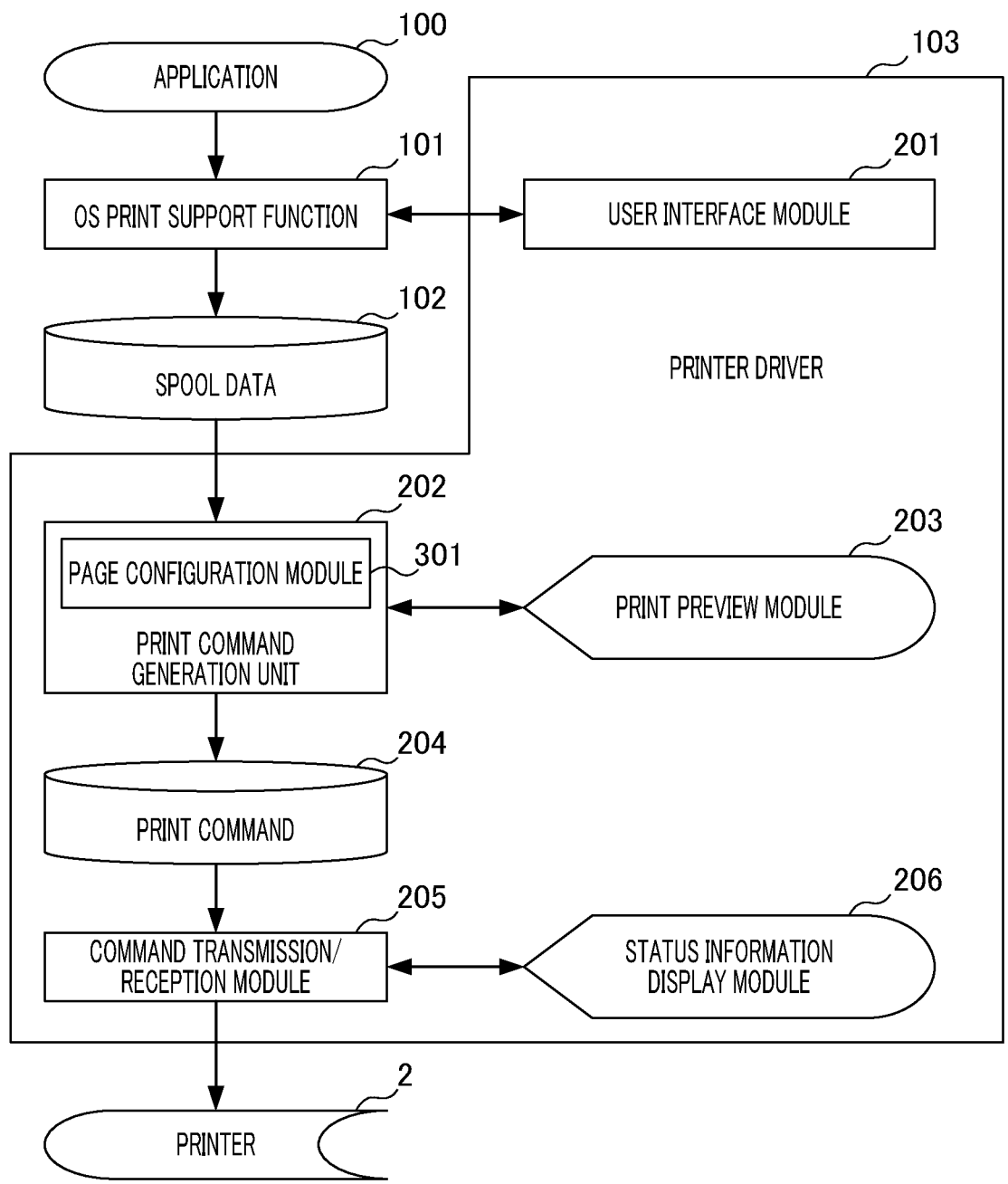
FIG. 2 is a block diagram illustrating an example of the function of a printer driver.

FIG. 2 is a block diagram illustrating an example of the function of a printer driver that realizes the information processing apparatus of the present embodiment. An OS, an application 100, and the printer driver 103, which are shown in FIG. 2, are stored in the external storage device 15. The operation processing of the OS and the printer driver 103 as described below is executed in accordance with the control of the CPU 12 provided in the personal computer 1 shown in FIG. 1. First, the application 100 generates print data corresponding to a print job. Subsequently, an OS print support function adds print setting information that has been input via a user interface provided in the user interface module 201 to print data. A command corresponding to print setting information is a print setting command. An OS print support function 101 stores print data, to which print setting information has been added, in the RAM 14. More specifically, the OS print support function 101 stores the print data as spool data of the print job in the print data storage unit 14b provided within the RAM 14.

The printer driver 103 shown in FIG. 2 includes a user interface module 201, a print command generation unit 202, a print preview module 203, a command transmission/reception module 205, and a status information display module 206. The user interface module 201 provides a user interface which is used by a user of the personal computer 1 to perform an operation input. For example, the user interface module 201 displays a user interface through which a user inputs print setting information on the display unit 17 shown in FIG. 1. A user can input print setting information by employing the displayed user interface.

The print command generation unit 202 functions as a print command generation unit that generates a print command 204 corresponding to the print job based on the spool data stored in the print data storage unit 14b. The print command generation unit 202 includes a page configuration module 301. The page configuration module 301 executes page configuration processing based on the spool data. More specifically, the page configuration module 301 determines the page configuration of the print data included in the spool data based on the print setting information appended to the print data. The print command generation unit 202 generates a print command based on the data after being subjected to page configuration processing. When generating a print command, the print command generation unit 202 may call the print preview module 203 to cause it to display a print preview screen. The print preview module 203 displays the print preview screen on the display unit 17. With this arrangement, a user can confirm the print result in advance.

The command transmission/reception module 205 functions as a print command transmission control unit. More specifically, the command transmission/reception module 205 receives the print command, which has been generated by the print command generation unit 202, from the print command generation unit 202. Then, the command transmission/reception module 205 transmits the received print command to the printer 2 to cause the printer 2 to print out the pages corresponding to the print command. Also, the command transmission/reception module 205 monitors the state of the printer 2 along with the transmission processing of the print command to the printer 2. To this end, the command transmission/reception module 205 acquires status information, which is managed by the status management program 24a provided within the ROM 24 of the printer 2, via the input/output interfaces 21 and 19. The command transmission/reception module 205 analyzes the acquired status information to thereby determine whether or not an error occurred in the printer 2. When the command transmission/reception module 205 determines that an error occurred on the printer 2, the command transmission/reception module 205 calls the status information display module 206. The status information display module 206 displays information, which indicates the state of the printer 2 in which an error occurred, on the display unit 17. With this arrangement, a user can confirm the state of the printer 2 in which an error occurred.

An operation specific to the present embodiment will now be described regarding the command transmission/reception module 205 and the print command generation unit 202. When an error occurred during printing of pages, the command transmission/reception module 205 determines whether or not the reprint of the print job for which an error occurred is executed, and stores the reprint job list in a predetermined storage device provided in the personal computer 1 based on the determination result. The reprint job list is a list of jobs to be reprinted. The reprint job is a print job for which an error occurred, i.e., a print job required to be reprinted. The reprint job list includes correspondence information between a job ID that is job identification information for identifying a reprint job and information about the number of printed pages at the moment when the error occurred. Note that a job ID is assumed to be assigned in advance to each print job. In other words, the command transmission/reception module 205 functions as a management unit configured to establish an association between and manage job identification information that identifies a print job for which an error occurred and information about the number of printed pages at the moment when the error occurred in a storage device.

Also, the print command generation unit 202 determines whether or not the print job to be processed is the reprint of interest based on the job ID that is included in the correspondence information provided in the reprint job list. More specifically, when the job ID of the print job to be processed coincides with the job ID in the reprint job list, the print command generation unit 202 determines that the print job to be processed is the reprint of interest. When the job ID of the print job to be processed does not coincide with the job ID in the reprint job list, the print command generation unit 202 determines that the print job to be processed is not the reprint of interest. When the print command generation unit 202 determines that the print job to be processed is the reprint of interest, the print command generation unit 202 skips the page configuration processing relating to printed pages and generates a print command based on the information about the number of printed pages, which is included in the correspondence information provided in the reprint job list. Skipping of page configuration processing relating to printed pages is to execute page configuration processing from an unprinted page without executing page configuration processing for the printed pages. The information processing method of the present embodiment can be realized by the function of the processing unit provided in the printer driver 103 shown in FIG. 2. Also, the computer program of the present embodiment is characterized in that it causes a computer to execute steps that are performed by the aforementioned information processing apparatus.

Figure 3:
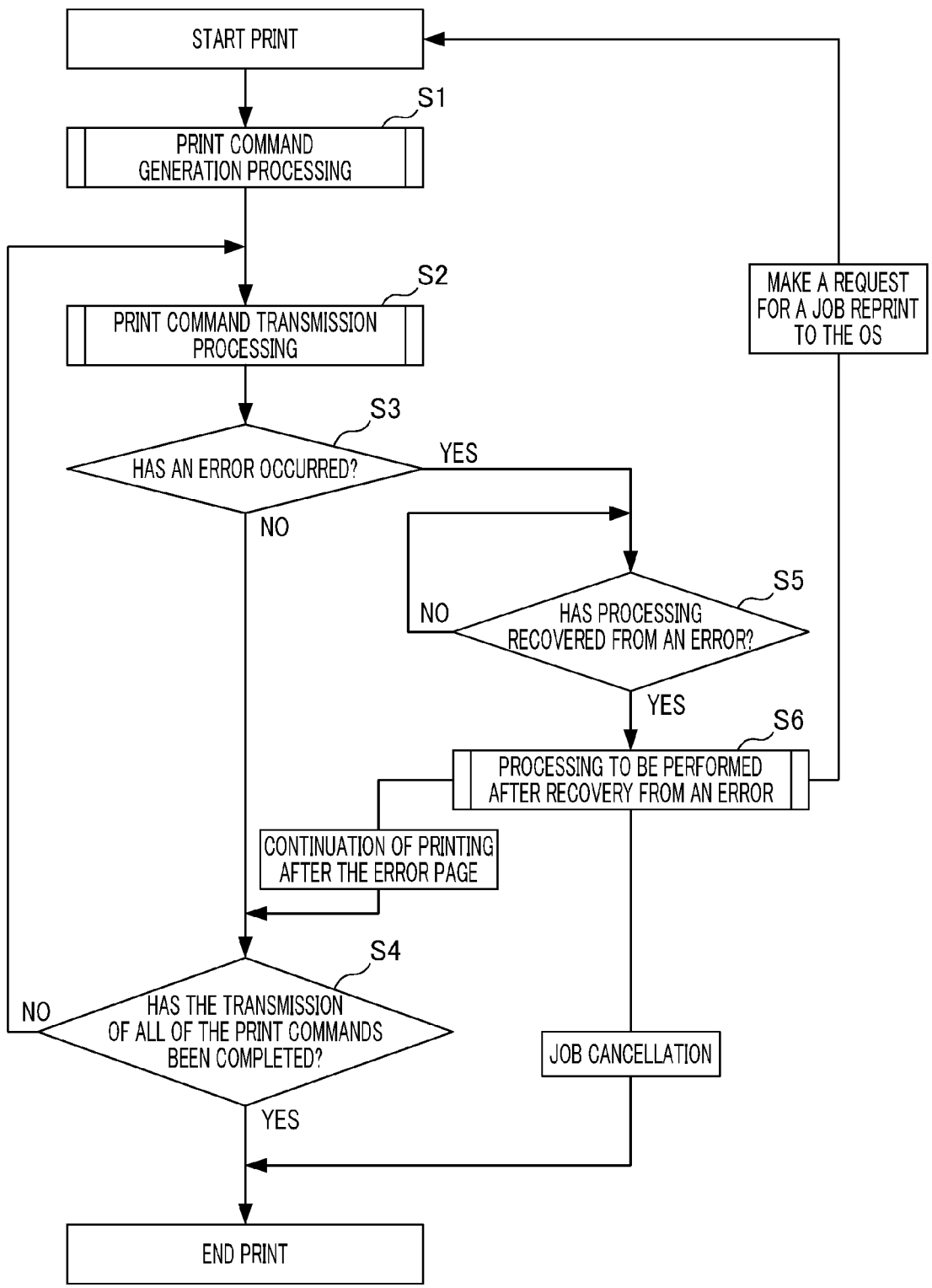
FIG. 3 is a diagram illustrating the operation processing flow for the printer driver of Example 1.

FIG. 3 is a diagram illustrating the operation processing flow for the printer driver of Example 1 of the present invention. When printing is started in accordance with an instruction given by the OS, the print command generation unit 202 performs processing for generating a print command corresponding to the print job (step S1). Subsequently, the command transmission/reception module 205 transmits the generated print command to a printer (step S2). The command transmission/reception module 205 determines whether or not an error occurred on the printer 2 in parallel with processing for transmitting the print command to the printer 2 (step S3).

When the command transmission/reception module 205 determines that an error has not occurred in the printer 2, the command transmission/reception module 205 determines whether or not the transmission of all of the print commands has been completed (step S4). When the command transmission/reception module 205 determines that there is a not-transmitted print command, the process returns to the step S2. When the command transmission/reception module 205 determines that the transmission of all of the print commands has been completed, the printer driver 103 ends print processing.

In the step S3, when the command transmission/reception module 205 determines that an error occurred on the printer 2, the command transmission/reception module 205 stops the print job, i.e., stops transmission of the print command to perform the following processing. The command transmission/reception module 205 determines whether or not the error in the printer 20 has been recovered (step S5). When the command transmission/reception module 205 determines that the error on the printer 20 has not been recovered, the process returns to the step S5. When the command transmission/reception module 205 determines that the error in the printer 20 has recovered, the command transmission/reception module 205 executes processing to be performed after recovery from an error, which will be described below with reference to FIG. 4A (step S6). As a result of processing performed after recovery from an error, a job reprint request to the OS, job cancellation, or continuation of printing after the error page is carried out. The job reprint request is a request for a reprint of print data corresponding to the erred print job.

Figures 4A, 4B:
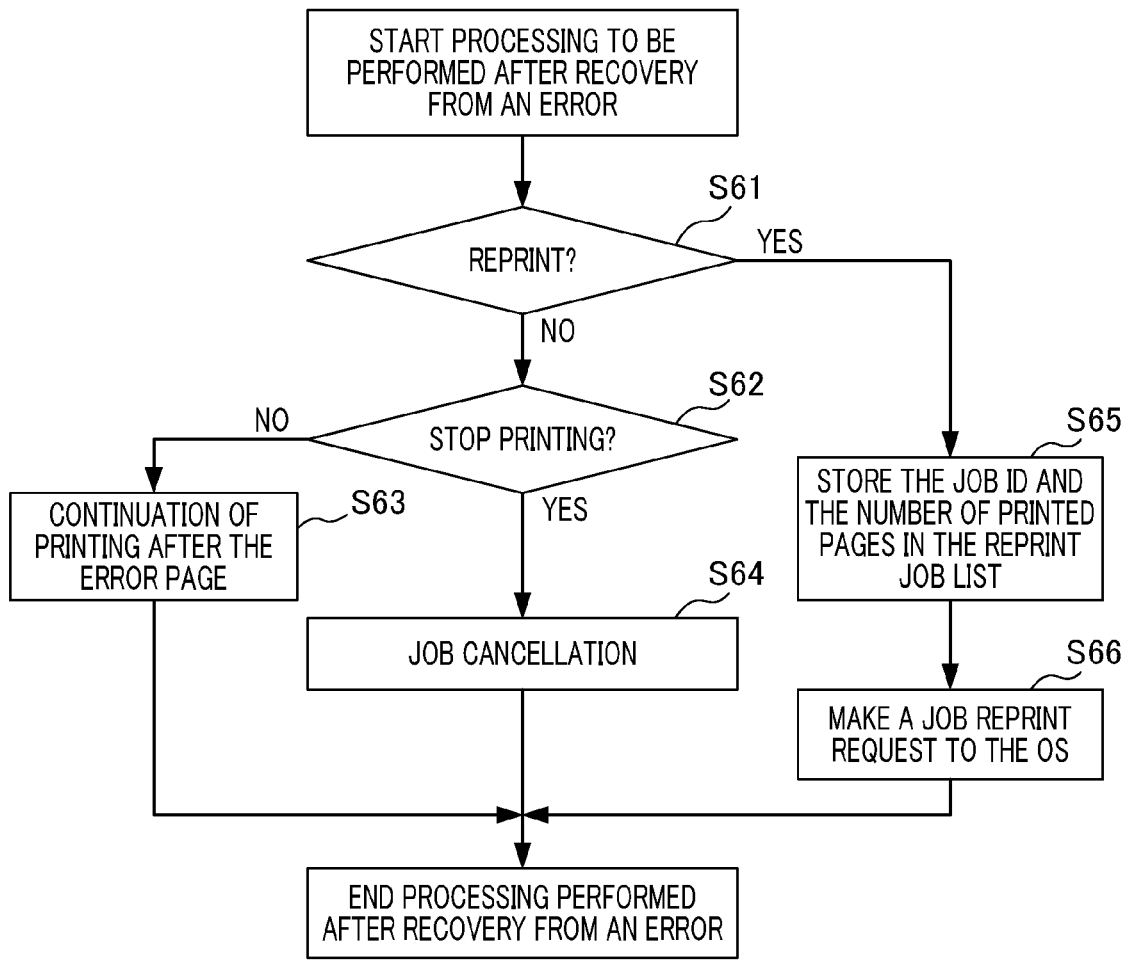
FIG. 4A is a diagram explaining processing to be performed after recovery from an error.
FIG. 4B is a diagram explaining a reprint job list.

FIG. 4A is a diagram explaining processing to be performed after recovery from an error. FIG. 4B is a diagram explaining a reprint job list. FIG. 4A shows processing to be performed after recovery from an error in step S6 shown in FIG. 3. First, the command transmission/reception module 205 determines whether or not an instruction about reprinting of pages has been made in accordance with predetermined reprint instruction information (step S61). Reprint instruction information is control information that provides an instruction about the reprinting of pages. Reprint instruction information is input by, for example, a user via a predetermined user interface. Note that the command transmission/reception module 205 may determine whether or not a reprint is made based on printer information such as the type of error, job information such as a type of print setting, personal computer information such as a type of input/output interface, and the state of the OS such as a version of the OS.

When the command transmission/reception module 205 determines that an instruction about reprinting of pages has not been made, the command transmission/reception module 205 determines whether or not an instruction to stop printing has been made in accordance with predetermined print stop instruction information (step S62). Print stop instruction information is control information that provides an instruction to stop printing. Print stop instruction information is input by, for example, a user via a predetermined user interface.

When the command transmission/reception module 205 determines that an instruction to stop printing has not been made, the command transmission/reception module 205 determines to continue the printing of pages after the page (step S63) at which the error occurred to thereby end processing to be performed after recovery from an error. Consequently, the process advances to step S4. When the command transmission/reception module 205 determines that an instruction to stop printing has been made, the command transmission/reception module 205 performs job cancel processing (step S64) to thereby end processing to be performed after recovery from an error. Consequently, print processing is ended.

In step S61, when the command transmission/reception module 205 determines that an instruction about reprinting of pages has been made, the command transmission/reception module 205 performs the following processing. The command transmission/reception module 205 stores the job ID of the current print job that has been stopped and the number of printed pages in the reprint job list (step S65). The print job, which has been stored in the reprint job list in step S65, is a reprint job. FIG. 4B shows an exemplary reprint job list in which the job ID and the number of printed pages are stored in step S65 for management. The job ID is reprint job identifying information. The number of printed pages represents the number of pages, which has been printed out, among the pages of print data corresponding to the reprint job. For example, the number of printed pages "4" corresponding to the jobID "5" represents that printing up to page 4 was completed and an error occurred on page 5.

Referring back to FIG. 4A, the command transmission/reception module 205 makes a job reprint request to the OS (step S66) to thereby end processing to be performed after recovery from an error. Thereafter, a reprint is started by the instruction given by the OS on which a reprint request has been received.

Figure 5:
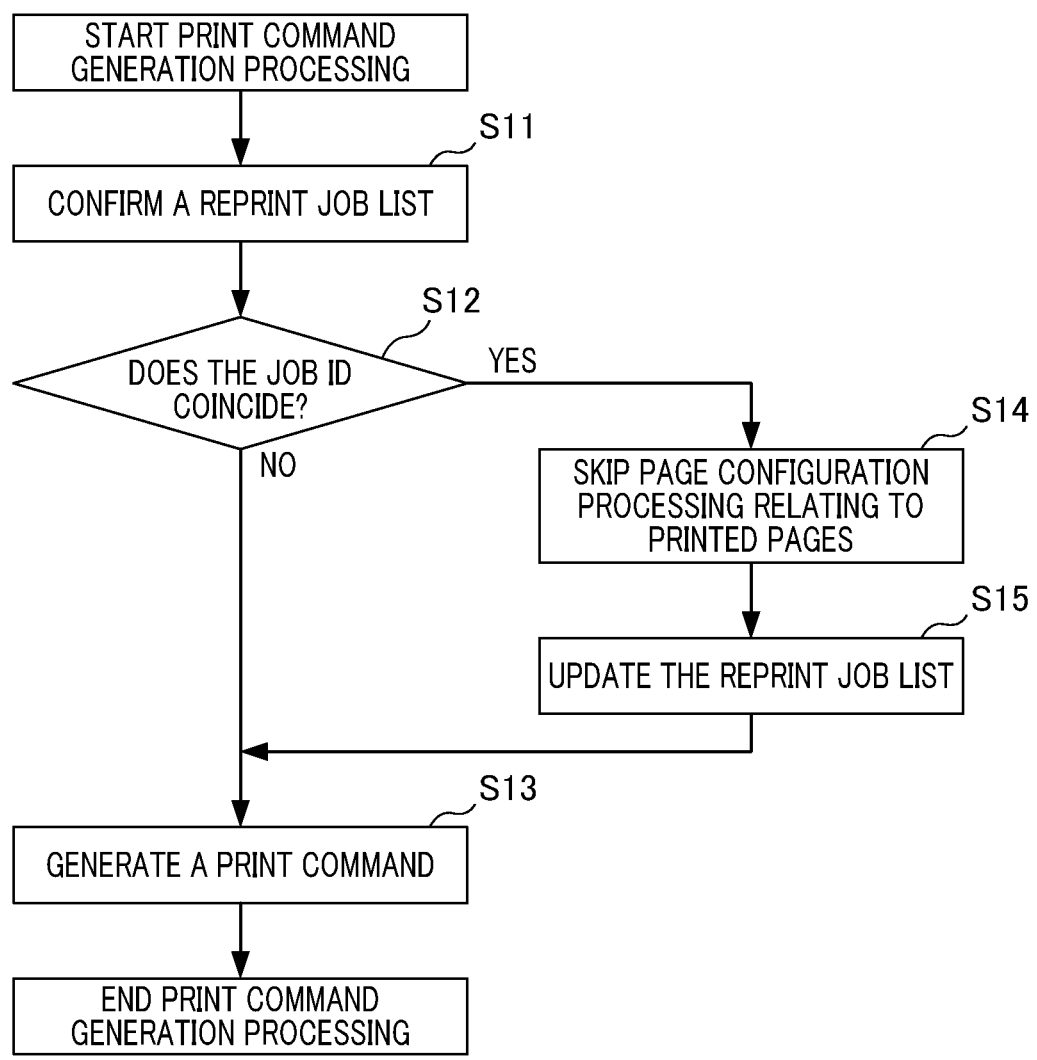
FIG. 5 is a diagram explaining an example of print command generation processing.

FIG. 5 is a diagram explaining an example of print command generation processing performed at step S1 shown in FIG. 3. When print command generation processing is started, the print command generation unit 202 confirms a reprint job list (step S11). The print command generation unit 202 determines whether or not the job ID of the print job to be currently processed coincides with the job ID that is stored in the reprint job list managed by the storage device (step S12). When the print command generation unit 202 determines that the job ID of the print job to be currently processed does not coincide with the job ID stored in the reprint job list, the print command generation unit 202 determines that the print job to be currently processed is not the reprint job. Then, the print command generation unit 202 generates a print command (step S13) to end processing. When the print command generation unit 202 determines that the job ID of the print job to be currently processed coincides with the job ID stored in the reprint job list, the print command generation unit 202 determines that the print job to be currently processed is the reprint job to thereby perform the following processing. Specifically, the page configuration module 301 provided in the print command generation unit 202 skips page configuration processing relating to printed pages based on the information about the number of printed pages, which is stored in the reprint job list (step S14). Then, the print command generation unit 202 updates the reprint job list by deleting the job ID of the reprint job corresponding to the pages of which page configuration processing has been skipped (step S15), and the process advances to step S13.

As described above, the print command generation unit 202 provided in the printer driver 103 of Example 1 performs the following processing when the job ID of the print job to be processed is managed by the storage device. The print command generation unit 202 skips page configuration processing relating to printed pages and generates a print command based on the information about the number of printed pages, which corresponds to the job ID and is managed by the storage device. Such processing by the printer driver 103 is applicable to, for example, the system spooler on the Windows™ system. According to Example 1, since the upstream side of the flow of print data processing, i.e., the print command generation unit 202 skips page configuration processing relating to printed pages, the processing load on the downstream side, i.e., the command transmission/reception module 205 is reduced. Consequently, the print processing overall becomes efficient.

There are various types of data for the spool data type for the print job. For example, the data types of spool data that is handled by the spooler of the Windows™ system include a data type which is spooled by a printer-interpretable print command and a data type which is spooled by an intermediate drawing command (hereinafter referred to as "extended data type"). In Example 2 described below, a description will be given under the specific assumption that the data types of spool data are a data type which is spooled by a printer-interpretable print command and an extended data type. Here, a data type which is spooled by a printer-interpretable print command includes, for example, RAW data or the like. RAW data is not spooled by an intermediate drawing command. An extended data type includes, for example, EMF (Enhanced Metafile) data or the like. Since spool data having a data type which is spooled by a printer-interpretable print command can be interpreted by a printer, the print command generation unit 202 may not perform page configuration processing. Since spool data having an extended data type cannot be interpreted by a printer, the print command generation unit 202 needs to perform page configuration processing.

The print command generation unit 202 provided in the printer driver 103 of Example 2 determines whether or not the data type of the spool data for the print job to be processed is an extended data type. When the print command generation unit 202 determines that the data type of the spool data is an extended data type, the print command generation unit 202 determines whether or not the print job to be processed is the reprint of interest, and skips page configuration processing relating to printed pages in accordance with the determination result. When the data type of the spool data is a data type which is spooled by a print command interpretable by the printer 2, the print command generation unit 202 does not perform page configuration processing for print data. Also, the command transmission/reception module 205 provided in the printer driver 103 of Example 2 performs the following processing at the start of print command transmission processing. The command transmission/reception module 205 determines whether or not the data type of the spool data for the print job to be processed is an extended data type. When the command transmission/reception module 205 determines that the data type of the spool data is not an extended data type, the command transmission/reception module 205 determines whether or not the print job to be processed is the reprint of interest based on the job ID included in the reprint job list. Then, when the command transmission/reception module 205 determines that the print job to be processed is the reprint of interest, the command transmission/reception module 205 skips the transmission of the print command corresponding to printed pages based on the information about the number of printed pages, which is included in the reprint job list.

The operation processing of the printer driver of Example 2 will now be described hereinbelow. The overall operation processing of the printer driver 103 of Example 2 is similar to the operation processing of the printer driver of Example 1 shown in FIG. 3.

Figure 6:
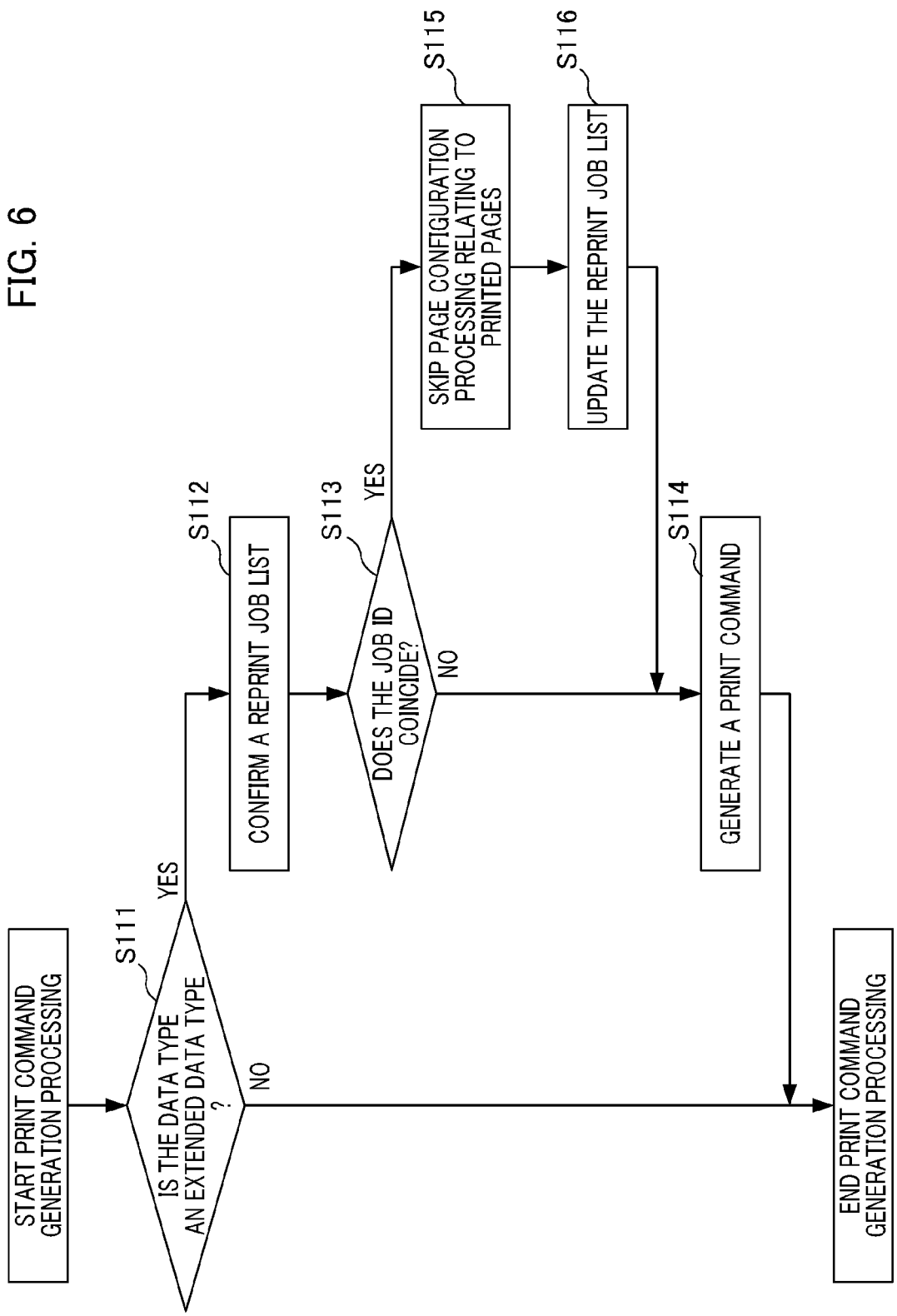
FIG. 6 is a diagram illustrating print command generation processing of the printer driver of Example 2.

FIG. 6 is a diagram illustrating print command generation processing of the printer driver of Example 2. Processing shown in FIG. 6 is processing corresponding to step S1 shown in FIG. 3 in Example 2. Steps S112 to S116 shown in FIG. 6 are the same as steps S11 to S15 shown in FIG. 5.

When print command generation processing is started, the print command generation unit 202 determines whether or not the data type of the spool data is an extended data type (step S111). In other words, the print command generation unit 202 determines whether or not the data type, of which the print job to be processed is spooled, is a data type that is spooled by an intermediate drawing command. When the data type of the spool data is EMF, the print command generation unit 202 determines that the data type is an extended data type. Also, when the data type of the spool data is RAW, the print command generation unit 202 does not determine that the data type is an extended data type. When the print command generation unit 202 determines that the data type of the spool data is an extended data type, the process advances to step S112. When the print command generation unit 202 determines that the data type of the spool data is not an extended data type, i.e., a data type which is spooled by a printer-interpretable print command, the print command generation unit 202 performs the following processing. The print command generation unit 202 ends print command generation processing without executing page configuration processing. In other words, when the print command generation unit 202 of Example 2 determines that the print job to be processed is a data type which is spooled by an intermediate drawing command and the job identification information for the print job to be processed is managed by the storage device, the print command generation unit 202 of Example 2 performs the following processing. The print command generation unit 202 skips page configuration processing relating to printed pages and generates a print command based on the information about the number of printed pages, which corresponds to the job identification information and is managed by the storage device.

FIG. 7 is a diagram illustrating print command transmission processing of the printer driver of Example 2. Processing shown in FIG. 7 is processing corresponding to step S2 shown in FIG. 3 in Example 2.

First, when print command transmission processing is started, the command transmission/reception module 205 determines whether or not the data type of the spool data is an extended data type (step S21). When the command transmission/reception module 205 determines that the data type of the spool data is an extended data type, the command transmission/reception module 205 transmits a print command to the printer 2 (step S22) to thereby end print command transmission processing.

When the command transmission/reception module 205 determines that the data type of the spool data is not an extended data type, the command transmission/reception module 205 determines that the print command generation unit 202 has not performed page configuration processing. Then, the command transmission/reception module 205 confirms the reprint job list (step S23). The command transmission/reception module 205 determines whether or not the job ID of the print job to be currently processed coincides with the job ID stored in the reprint job list (step S24). When the command transmission/reception module 205 determines that the job ID of the print job to be currently processed does not coincide with the job ID stored in the reprint job list, the command transmission/reception module 205 determines that the print job to be currently processed is not the reprint job. Then, the process advances to step S22.

When the command transmission/reception module 205 determines that the job ID of the print job to be currently processed coincides with the job ID stored in the reprint job list, the command transmission/reception module 205 determines that the print job to be currently processed is the reprint job. Then, the command transmission/reception module 205 performs the following processing. Specifically, the command transmission/reception module 205 determines that the transmission of the print command corresponding to printed pages is skipped based on the information about the number of printed pages, which is stored in the reprint job list (step S25). When the command transmission/reception module 205 determines that the transmission of the print command corresponding to printed pages is skipped, the command transmission/reception module 205 determines that the transmission of a print setting command relating to the printed pages is not skipped. Thus, when the command transmission/reception module 205 performs print command transmission processing in step S22, the command transmission/reception module 205 transmits a print setting command relating to the printed pages to the printer 2. After processing in the step S25, the command transmission/reception module 205 deletes the job ID of the reprint job from the reprint job list (step S26), and the process advances to step S22. In other words, when the print job to be processed is not a data type which is spooled by an intermediate drawing command and the job identification information for the print job to be processed is managed by the storage device, the command transmission/reception module 205 of Example 2 performs the following processing. The command transmission/reception module 205 skips the transmission of the print command corresponding to printed pages based on the information about the number of printed pages, which corresponds to the job identification information and is managed by the storage device.

According to Example 2 described with reference to FIGS. 6 and 7, the subject for which processing related to a page is skipped is switched during reprinting depending on the data type of the spool data, whereby the overall print processing can become efficient. Also, even when the printer driver 103 of Example 2 determines that the transmission of the print command corresponding to printed pages is skipped, the printer'driver 103 of Example 2 does not skip the transmission of a print setting command relating to the printed pages (see step S25 in FIG. 7). Thus, in the printer 2, it is possible to prevent the output result of the reprinted page being different from the output result obtained when printing is normally completed instead of causing an error.

As a variation of the present example, processing of step S21 shown in FIG. 7 may be omitted, and the command transmission/reception module 205 may perform the following processing in step S24.

In step S24, when the job ID of the print job coincides with the job ID in the reprint job list, the command transmission/reception module 205 determines that page configuration processing has not been skipped by the print command generation unit 202, and the process advances to step S25. To this end, in this variation, once the print command generation unit 202 determines that the job ID of the print job coincides with the job ID in the reprint job list (see step S113 shown in FIG. 6), the print command generation unit 202 updates the reprint job list. This is because the subsequent command transmission/reception module 205 starts leading page transmission processing before the page configuration module 301 provided in the print command generation unit 202 ends page configuration processing for all pages.

Next, a description will now be given of Example 3. In Example 3, when the print command generation unit 202 provided in the printer driver 103 skips page configuration processing relating to printed pages, the print command generation unit 202 changes the print setting corresponding to the print job to be reprinted. Then, the print command generation unit 202 generates a print command based on the changed print setting. For example, when the print command generation unit 202 determines in step S12 shown in FIG. 5 or step S113 shown in FIG. 6 that the job ID of the print job to be processed coincides with the job ID in the reprint job list, the print command generation unit 202 displays a confirmation screen for the start of reprinting shown in FIG. 8A. The confirmation screen is a screen that notifies the user about the start of reprinting. On the confirmation screen, the print setting items corresponding to the print job to be reprinted, such as the sheet feeding method, the paper type, or the like. A print setting selection column is provided in association with each of the print setting items. The selection column is a column that selects a print setting. In the example shown in FIG. 8A, selection columns 100 and 101 are provided in association with the sheet feeding method and the paper type, respectively. When a user selects the sheet feeding method and the paper type using the selection columns 100 and 101, and performs the operation by clicking the "start printing" button, the print command generation unit 202 performs the following processing. The print command generation unit 202 sets the print setting corresponding to the print job to be reprinted to the sheet feeding method and the paper type that have been selected. With this arrangement, the print setting is changed. In other words, when the job ID of the print job to be processed is managed by the storage device, the print command generation unit 202 changes the print setting of the print job, and generates a print command based on the changed print setting. According to Example 3, the reprint job can be printed through the print setting that is different from the previous one, and thus, a reoccurrence of the same error can be prevented.

Figures 8A, 8B:
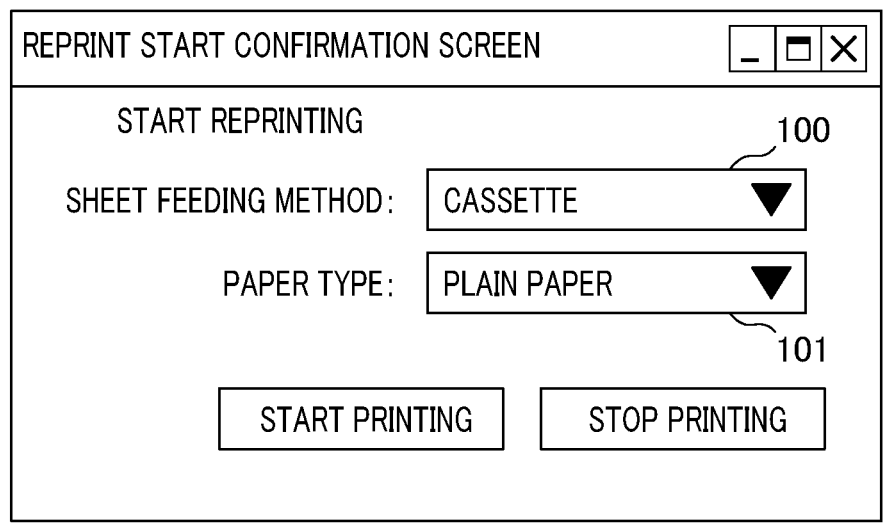
FIG. 8A is a diagram illustrating a reprint start confirmation screen.
FIG. 8B is a diagram illustrating a reprint job list.

As a variation of the present example, the print command generation unit 202 may switch the print setting items, which are displayed on the aforementioned confirmation screen, depending on the type of error that caused a reprint. In order to ensure that the print command generation unit 202 switches the print setting items, which are displayed on the aforementioned confirmation screen, depending on the type of error, the print command generation unit 202 needs to recognize the type of error. Thus, in this variation, the command transmission/reception module 205 stores the reprint job list including the job ID, the number of printed pages, and the type of error in the predetermined storage device, as shown in FIG. 8B. When the print command generation unit 202 determines that the job ID of the print job coincides with the job ID in the reprint job list, the print command generation unit 202 extracts the type of error corresponding to the coinciding job ID from the reprint job list for acquisition. Then, the print command generation unit 202 determines the print setting item corresponding to the type of the acquired error based on the correspondence information between a predetermined type of error and the print setting item, and displays the print setting item on the confirmation screen. By means of this processing performed by the print command generation unit 202, a user can readily set a desired print setting depending on the type of error that occurred to the print job to be reprinted. In other words, the print command generation unit 202 determines the print setting to be changed depending on the type of error that occurred.

Figure 9:
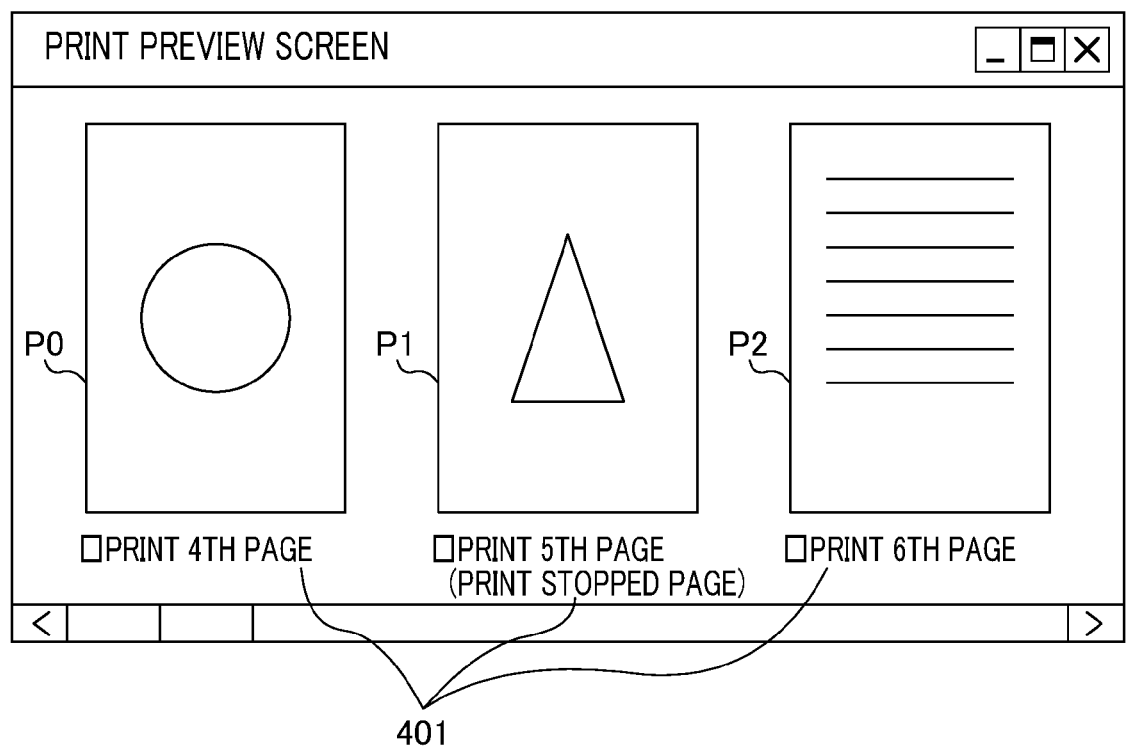
FIG. 9 is a diagram illustrating a print preview screen.

Next, a description will now be given of Example 4. In Example 4, when the print command generation unit 202 determines that the print job to be processed is the reprint of interest, the print command generation unit 202 displays the preview screen for the print job to be reprinted, and generates a print command for a page after the page that has been selected on the preview screen. More specifically, when the print command generation unit 202 determines in step S12 shown in FIG. 5 or step S113 shown in FIG. 6 that the job ID of the print job coincides with the job ID in the reprint job list, the print command generation unit 202 calls the print preview module 203. Then, the print command generation unit 202 provides an instruction to the print preview module 203 to cause it to display, for example, a print preview screen as shown in FIG. 9.

The print preview screen is a screen for setting the print start page. The print command generation unit 202 displays a page P1 that is a page at which an error occurred, a page P0 that is the page before page P1, and a page P2 that is the page after page P1 on the print preview screen shown in FIG. 9. In the example shown in FIG. 9, page P1 is the 5th page, page P. is the 4th page, and page P1 is the 6th page. The print command generation unit 202 establishes an association between the pages to be displayed so as to display a print start page selection column 401. The print start page selection column 401 is a column for selecting a page from which the printing is started, i.e., a page from which a print command generation is started.

A user can see the pages, which are displayed on the print preview screen, to thereby confirm whether or not the data required for page P1, which is the page at which an error occurred, is missing. When a user determines that the data required for page P1 is missing and checks the print start page selection column 401 corresponding to page P1, page P1 is selected as the print start page. Then, the print command generation unit 202 generates a print command for a page after page P1 inclusive. In other words, the print command generation unit 202 in Example 4 displays the preview screen relating to the print job when the job ID of the print job to be processed is managed by the storage device. Then, the print command generation unit 202 generates a print command for a page after the page that has been selected on the preview screen.

For example, when the printer 2 prints out a Web page and page P1, at which the error occurred, is an advertisement which occupies the lower part of the Web page and does not need to be reprinted, a user checks the print start page selection column 401 corresponding to page P2. With this arrangement, page P2 is selected as the print start page. For example, when a user checks the print start page selection column 401 corresponding to page P0, page P0 is reprinted. With this arrangement, the printing is started from the previous page of the page at which the error occurred, whereby missing of required data can be reliably prevented.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example, via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-285454 filed Dec. 16, 2009, which are hereby incorporated by reference herein in their entirety.

What is claimed is:

1. An information processing method executed by an information processing apparatus comprising a storage device and connected with a printing device, the method comprising:
   generating by using a command generation module, a print command based on spool data of a print job;
   transmitting by using a command transmission module, the generated print command to the printing device in order to print pages corresponding to the generated print command on the printing device;
   determining, by the command transmission module, whether an error has occurred in the printing device;
   managing in the storage device, in a case where the determining step determines that an error has occurred, a correspondence between job identification information that identifies the print job for which the error occurred and information about a number of printed pages at a moment when the error occurred;
   issuing an instruction for reprinting of the print job for which the error occurred;
   determining whether the print job to be processed for reprinting is a data type to be spooled by an intermediate drawing command, and whether job identification information of the print job to be processed for reprinting coincides with job identification information managed by the storage device;
   controlling the transmitting by using the command transmission module so that transmission of a part of the print command generated by using the command generation module is skipped, when the determining step determines that the print job to be processed for reprinting is not the data type to be spooled by the intermediate drawing command and the job identification information of the print job to be processed coincides with the job identification information managed by the storage device, wherein the part of the print command corresponds to the printed pages; and
   transmitting, for using the print command corresponding to remaining pages that have not been printed for printing in the printing device, a print setting command relating to the printed pages to the printing device, when the transmitting of the part of the generated print command is skipped by using the command transmission module, and
   wherein, when it is determined that the print job to be processed for reprinting is the data type to be spooled by the intermediate drawing command and job identification information of the print job to be processed coincides with the job identification information managed by the storage device, a print command based on spool data of remaining pages included in the print job to be processed for reprinting is generated by using the command generation module according to the information about the number of printed pages managed by the storage device, and the generated print command based on spool data of remaining pages is transmitted to the printing device by the command transmission module.

2. The information processing method according to claim 1, further comprising:
   when the job identification information of the print job to be processed coincides with the job identification information managed by the storage device, changing a print setting of the print job to be processed to thereby generate a print command based on the changed print setting.

3. The information processing method according to claim 2, wherein a print setting to be changed is determined depending on a type of the occurred error.

4. The information processing method according to claim 1, further comprising:
   when the job identification information of the print job to be processed coincides with the job identification information managed by the storage device, displaying a preview screen showing the print job and generating, by using the command generation module, the print command based on the spool data of the remaining pages, in the print job, beginning with a page that has been selected on the preview screen.

5. The information processing method according to claim 1, wherein the data type to be spooled by the intermediate drawing command is EMF (Enhanced Metafile).

6. An information processing apparatus that is connected with a printing device and comprises a storage device, the information processing apparatus comprising:
   a print command generation unit configured to generate a print command based on spool data of a print job;
   a print command transmission control unit configured to transmit the generated print command to the printing device in order to print the pages corresponding to the generated print command on the printing device, and configured to determine whether an error has occurred in the printing device;
   a management unit configured to manage, in the storage device, in a case where the print command transmission control unit determines that an error has occurred, a correspondence between job identification information that identifies the print job for which the error occurred and information about a number of printed pages at a moment when the error occurred;
   a reprint instruction issuing unit configured to issue an instruction for reprinting of the print job for which the error occurred;
   a determination unit configured to determine whether the print job to be processed for reprinting is a data type to be spooled by an intermediate drawing command, and whether job identification information of the print job to be processed for reprinting coincides with job identification information managed by the storage device,
   wherein, when the determination unit determines that the print job to be processed for reprinting is not the data type to be spooled by the intermediate drawing command and the job identification information of the print job to be processed for reprinting coincides with the job identification information managed by the storage device, the print command transmission control unit controls a transmission of the print command generated by the print command generation unit to skip transmission of a part of the generated print command, wherein the part of the print command corresponds to printed pages; and
   a print setting command transmission unit configured to transmit, for using the print command corresponding to remaining pages that have not been printed for printing in the printing device, a print setting command relating to the printed pages to the printing device, when the transmitting of the part of the generated print command is skipped by using the print command transmission control unit, and
   wherein, when the determination unit determines that the print job to be processed for reprinting is the data type to be spooled by the intermediate drawing command and the job identification information of the print job to be processed coincides with the job identification information managed by the storage device, the print command generation unit generates a print command based on spool data of remaining pages included in the print job to be processed for reprinting, according to the number of printed pages managed by the storage device, and the print command transmission control unit transmits the print command generated based on the spool data of the remaining pages to the printing device.

7. A non-transitory computer readable storage medium on which is stored a computer program for making an information processing apparatus comprising a storage device and that is connected with a printing device execute:

generating by using a command generation module, a print command based on spool data of a print job;

transmitting by using a command transmission module, the generated print command to the printing device in order to print pages corresponding to the generated print command on the printing device;

determining, by the command transmission module, whether an error has occurred in the printing device;

managing in the storage device, in a case where the determining step determines that an error has occurred, a correspondence between job identification information that identifies the print job for which the error occurred and information about a number of printed pages at a moment when the error occurred;

issuing an instruction for reprinting of the print job for which the error occurred;

determining whether the print job to be processed for reprinting is a data type to be spooled by an intermediate drawing command, and whether job identification information of the print job to be processed for reprinting coincides with the job identification information managed by the storage device;

controlling the transmitting by using the command transmission module so that transmission of a part of the print command generated by using the command generation module is skipped, when the determining step determines that the print job to be processed is not the data type to be spooled by the intermediate drawing command and the job identification information of the print job to be processed coincides with the job identification information managed by the storage device, wherein the part of the print command corresponds to the printed pages; and transmitting, for using the print command corresponding to remaining pages that have not been printed for printing in the printing device, a print setting command relating to the printed pages to the printing device, when the transmitting of the part of the generated print command is skipped by using the command transmission module, and wherein, when it is determined that the print job to be processed for reprinting is the data type to be spooled by the intermediate drawing command and job identification information of the print job to be processed coincides with the job identification information managed by the storage device, a print command based on spool data of remaining pages included in the print job to be processed for reprinting is generated by using the command generation module according to the information about the number of printed pages managed by the storage device, and the generated print command based on spool data of remaining pages is transmitted to the printing device by the command transmission module.

* * * * *